United States Patent [19]

Franze

[11] 4,255,217
[45] Mar. 10, 1981

[54] METHOD OF FORMING AN EMBOSSED DECORATIVE SURFACE COVERING

[75] Inventor: John P. Franze, Lancaster, Pa.

[73] Assignee: Armstrong Cork Company, Lancaster, Pa.

[21] Appl. No.: 823,914

[22] Filed: Aug. 12, 1977

[51] Int. Cl.³ .............................................. B32B 31/00
[52] U.S. Cl. .................................. 156/209; 156/247; 156/322; 264/284
[58] Field of Search ............... 156/209, 214, 247, 249, 156/242, 246, 322; 428/172; 264/284, 293, 316, 212, 214, 319, 331

[56] References Cited
U.S. PATENT DOCUMENTS

| | | | |
|---|---|---|---|
| 3,481,818 | 12/1969 | Wellen | 156/209 |
| 3,507,733 | 4/1970 | Davidson | 156/247 |
| 3,575,754 | 4/1971 | Duerden et al. | 156/247 |

*Primary Examiner*—David A. Simmons

[57] ABSTRACT

A method of forming an embossed decorative surface covering having a backing material and a plastic-type surface material. A layer of liquid plastic-type material is coated onto a strippable carrier to form a composite. This composite is heated by bringing the uncoated side of the strippable carrier into contact with a heated embossing roll. That portion of the liquid plastic-type material in heat contact with the surface of the embossing roll through the strippable carrier becomes non-fluid. The plastic-type material is bonded to a backing material and is fused in a pattern that duplicates the pattern of the embossing roll as the strippable carrier, plastic-type material, and backing material pass through the nip between the heated embossing roll and a back-up roll. The strippable carrier is then removed from the embossed decorative surface covering.

16 Claims, 1 Drawing Figure

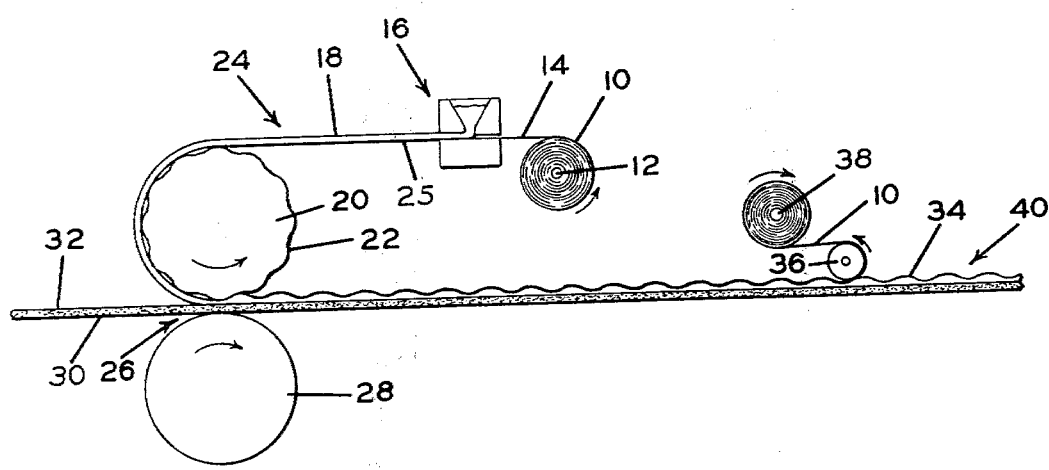

METHOD OF FORMING AN EMBOSSED DECORATIVE SURFACE COVERING

BACKGROUND OF THE INVENTION

1. Field of the Invention

This invention is directed to a method of manufacturing a decorative surface covering and, more particularly, to a method of forming an embossed decorative surface covering having a plastic-type surface material.

2. DESCRIPTION OF THE PRIOR ART

U.S. Pat. No. 3,507,733, which appears to be the most relevant prior art, discloses a method of producing embossed decorative floor and wall coverings of thermoplastic material with the aid of release paper. However, the thermoplastic material to be embossed in this patent is in the form of a granulated resin, whereas the plastic-type material to be embossed in the method of the invention described herein is in the form of a liquid coating. Also, the thermoplastic material which takes the embossing is originally positioned on a substrate, whereas in the invention described herein, the plastic-type material which takes the embossing is originally positioned on the release paper.

SUMMARY OF THE INVENTION

A strippable supporting material is provided as a carrier. The carrier moves to a coating station where a uniform layer of liquid plastic-type material is coated onto the strippable supporting material to form a strippable supporting material/plastic-type material composite. The composite then travels to a heated embossing roll having any pattern which is desired to be embossed onto the finished product. The composite is heated by positioning the strippable supporting material of the composite against the heated embossing roll. As the composite moves in contact with the rotating embossing roll, that portion of the liquid plastic-type material which is in heat contact with the surface of the embossing roll through the strippable supporting material becomes non-fluid. A backing material, which may or may not be heated, is brought into contact with the plastic-type material of the composite. Pressure is applied to the combination of the composite and the backing material in the nip between the heated embossing roll and back-up roll while the composite continues to be heated by the embossing roll. The heat and pressure serves to bond the plastic-type material to the backing material and to fuse the plastic-type material in the pattern that duplicates whatever desired pattern is on the embossing roll. After the combination of the composite and backing material leaves the nip between the heated embossing roll and the back-up roll, the strippable material is removed from the fused plastic-type material of the embossed decorative surface covering.

An object of this invention is to describe a method of making an embossed decorative surface covering having a backing material and a plastic-type surface material wherein the backing material will not be distorted or moved as the plastic-type surface material is embossed.

Another object of the invention is to describe a method of forming an embossed decorative surface covering having a backing material and plastic-type surface material wherein the maximum amount of surface material is placed at the raised or load-bearing areas on the embossed surface of the covering.

A further object of the invention is to describe a technique of making an embossed decorative surface covering having a backing material and a plastic-type surface material wherein this composite covering may be reheated without changing the original embossing profile of the surface.

A still further object of the invention is to describe a method of forming an embossed decorative surface covering which has no backing material but which may be used for laminating to a backing material or substrate at a later time.

BRIEF DESCRIPTION OF THE DRAWING

The Figure is a diagrammatic of the method of forming the embossed decorative surface covering of this invention.

DESCRIPTION OF THE PREFERRED EMBODIMENT

A strippable carrier 10, a release paper, is unwound from a conventional unwinding roll 12. Side 14 of release paper 10 has a release coating thereon. An example of a release-coated release paper 10 is a release paper of the S. D. Warren Company having a stearato-chromic chloride complex release coating which goes by the trademark Quillon. This Quillon-coated release paper has a weight of 65 pounds (29.45 kg) [500 sheets, 25"×38" (63.5 cm × 96.52 cm)]; a minimum Elmendorf tear strength of 45 grams in the machine direction and 55 grams in the across machine direction; a minimum tensile strength of 22 psi in the machine direction and 10 psi in the across machine direction; a minimum burst of 21 psi; a gloss of 8–15 at 60° F. (15.6° C.); and a porosity per square centimeter in the range of about 94 cc/min. to 220 cc/min. at 3 psi. Various release carriers with various release coatings thereon can be easily substituted for the example of release paper 10 with the Quillon release coating thereon. For example, the release carrier may be woven or non-woven or made in any other conventional manner of the following materials: glass fibers, polyester fibers, rayon fibers, cotton fibers, or various combinations thereof. Some examples of release coatings would be silicone, high melt polypropylene, high melt polyethylene, and others known to those skilled in the art. These examples are not meant to be limiting, but only illustrative of various release carriers and various release coatings for use thereon.

The release paper 10 passes from the conventional unwind roll 12 to conventional plastic-type material application equipment 16, such as a dead roll coater, a metering roll coater, a doctor blade coater, a ribbed or smooth roll coater, a reverse roll coater, a forward roll coater, or any other such coater known to those skilled in the art. At this plastic-type material applicator 16, a layer of plastisol 18 of uniform thickness is continuously coated onto the release coated side 14 of release paper 10 by the applicator 16. An example of a plastisol 18 coated on the release coated side 14 of release paper 10 has the following formula, the amounts being shown on a percentage by weight basis:

| | |
|---|---:|
| Polyvinyl Chloride, weight avg. molecular weight 233,000 (trademark - Tenneco 1738) | 37.62% |
| Polyvinyl Chloride, weight avg. molecular weight 95,300 (trademark - Tenneco VC 501) | 28.24% |
| Butyl-benzyl phthalate and do decyl benzene mixture | 15.21% |

-continued

| | |
|---|---|
| (trademark - Monsanto S-213) | |
| di(2-ethyl hexyl) phthalate | 15.21% |
| (trademark - Monsanto DOP) | |
| Octyl epoxy tallate | 1.19% |
| (trademark - Drapex 4.4) | |
| dibutyl tin bis iso octyl maleate | 1.00% |
| (trademark - Argus Chem. M-275) | |
| Polyethylene glycol ether | 1.53% |
| (trademark - Union Carbide Tergital 15-5-7) | |

In this example, the layer of plastisol 18 is coated onto the Quillon release coated side 14 of release paper 10 with a dead roll coater. The layer has a thickness of about 0.015" (0.038 cm). The thickness of the layer of plastisol may range from about 0.006" (0.015 cm) to 0.025" (0.063 cm).

Another example of a plastisol which can be coated onto the release coated side 14 of release paper 10 is as follows, the amounts again being given on a percentage by weight basis:

| | |
|---|---|
| Polyvinyl Chloride, weight avg. molecular weight 106,000 | 67.3% |
| (trademark - Tenneco 1732) | |
| Mixture of C-7, C-9, C-11 alkyl phthalates | 23.3% |
| (trademark - Monsanto S-711) | |
| C-7, C-9 adipate | 6.7% |
| (trademark - Monsanto S-97) | |
| Octyl epoxy tallate | 0.7% |
| (trademark - Drapex 4.4) | |
| Barium, zinc, phosphite | 2.0% |
| (trademark - Synpron L-744) | |

The material to be coated onto the release paper is not intended to be limited to only non-foamable plastisols such as are set forth in the above examples since foamable plastisols may also be used. Other materials such as epoxies, polyurethanes, polyesters, and other thermoplastic and thermosetting materials can be used in this method. It is preferred, however, that the materials used have no volatile solvents therein.

The plastisol coated release paper moves from the plastisol coater 16 to a heated embossing roll 20 which is independently driven in any conventional manner. The embossing roll 20 may have any desired embossed pattern 22 around its circumference. Embossing roll 20 must be capable of being heated to temperatures in excess of 180° F. (82.2° C.), the temperature being dependent mainly on the materials being used and the speed at which this method is being carried out. In this particular example, the embossing roll is at a temperature of 265° F. (129.4° C.). The diameter of embossing roll 20 should be greater than 7", and the depth of embossing of the desired pattern 22 may range from about 0.006" (0.015 cm) to 0.030" (0.076 cm). In this particular example, the diameter of the embossing roll is 11.5" (29.2 cm), and the embossing depth of the desired embossing pattern 22, a random nubbly embossing pattern is 0.012" (0.030 cm).

As the plastisol coated paper 24 comes into contact with the heated embossing roll 20, it is the uncoated side 25 of release paper 10 that touches the ridges or high points of the desired embossing pattern 22 of embossing roll 20. The plastisol coated paper 24 moves with the rotating embossing roll 20 while in contact with the ridges of the desired embossing pattern 22 thereon. In this example, the plastisol coated paper is in contact with the rotating embossing roll 20 through an arc of approximately 180°.

It is important that the plastic-type material applied by coater 16 be viscous enough so that it does not move substantially, e.g., run off the release paper at its edges or move in the machine direction, so as to change the uniform thickness of the coated plastic-type material. Also, another factor which may contribute to the moving of the plastic-type material coated by applicator 16 is the release coating on the release carrier. It is important that the release coating be capable of releasing the plastic-type material at the end of the process but not be so releasable that it acts like a wax which allows the plastic-type material to move substantially on the carrier during the process.

As the plastisol coated paper 24 moves in contact with the independently driven embossing roll 20, heat from the embossing roll is transferred to and through the release paper 10 to the plastisol layer 18. The most heat is transferred to the plastisol 18 at those areas where the ridges of the desired embossed pattern 22 touch the side 25 of release paper 10. The plastisol 18 is gelled at it moves in contact with the rotating heated embossing roll 20.

After the plastisol coated paper 24 has travelled in contact with the rotating heated embossing roll 20 through an arc of approximately 180°, the plastisol coated paper enters the nip 26 between embossing roll 20 and backing roll 28, which is also independently driven. The nip 26 in this example has an opening of about 0.100" (0.254 cm). Generally, the opening of the nip should be such that it does not exceed the sum of the thicknesses of the release paper, the release paper coating, the plastic-type material coating, the backing material, and the printing on the backing material; and preferably, this opening should be about 0.005" (0.013 cm) to 0.010" (0.025 cm) less than the above specified sum of thicknesses depending on the hardness of the back-up roll. In this example, the backing roll 28 is made of rubber having a Durometer reading of 85. A rubber backing roll should have a Durometer reading in the range of from about 55 to 90. Alternatively, the backing roll 28 could be made of steel or any other appropriate material.

A convenient backing material 30 is also fed into the nip 26 between embossing roll 20 and backing roll 28. Depending on what material is being used for the substrate material 30, the backing roll 28 is either heated, unheated, i.e., no external heat is applied thereto other than that heat which may come from or be generated by the system itself, or cooled. In this example, the backing roll 28 is unheated but does receive heat from the system as it is operating so that the temperature of the roll rises above ambient temperature conditions.

In this example, the backing material 30 is a printed non-woven glass paper. This glass paper has 65% chopped glass fiber, 5% polyvinyl alcohol fiber, and 30% polyester fiber and a styrene-butadiene rubber and melamine binder, and has a weight of 82 pounds (37.15 kg) [500 sheets, 25"×38" (63.5 cm × 96.52 cm)]; a minimum tensile strength in the machine direction of 2236 psi and in the across machine direction of 845 psi; and a porosity per square centimeter of 7621 cc/min. at 3 psi. The printing ink used to print the glass paper of this example is a plastisol printing ink having the following formula, the amounts being shown on a percentage by weight basis:

| | |
|---|---|
| Polyvinyl Chloride, weight avg. molecular weight 233,000 (trademark - Tenneco 1738) | 36.62% |
| Polyvinyl Chloride, weight avg. molecular weight 95,300 (trademark - Tenneco VC 501) | 27.50% |
| di(2-ethyl hexyl) phthalate (trademark - Monsanto DOP) | 24.33% |
| 2,2,4-trimethyl, 1,3-pentanediol diisobutyrate ester (trademark - Kodaflex TXIB) | 3.17% |
| Octyl epoxy tallate (trademark -Drapex 4.4) | 1.16% |
| dibutyl tin bis iso octyl maleate (trademark - Argus Chem. M-275 | 0.97% |
| Pigment paste (50% solids) (pigment paste concentration may vary from 5% to 10%) | 6.25% |

The printed glass paper backing 30 of this example is heated to 325° F. (162.8° C.) in any conventional manner before it is brought into nip 26 between embossing roll 20 and rubber backing roll 28. Although the glass paper substrate 30 is heated, it is not a limitation of the method of this invention. This substrate material 30 may be brought into the nip 26 between embossing roll 20 and backing roll 28 in an unheated condition. The heated or unheated condition of the backing 30 is dependent upon the various processing parameters of this method, e.g., the plastic-type material used, the release paper used, the temperature of the embossing roll, and the line speed used. Other materials, by way of example only, which could be used for the backing material 30 are woven fiber glass, beater-saturated asbestos material such as that sold by Armstrong Cork Company under the trademark Hydrocord, vinyl chloride tile blanket, and vinyl-asbestos tile blanket such as one which has the following formula, the amounts being given on a percentage by weight basis:

| | |
|---|---|
| A mixture of 86% polyvinyl chloride and 14% polyvinyl acetate, weight avg. molecular weight 41,600 (trademark - Union Carbide VYHH | 5.0% |
| Polyvinyl chloride, weight avg. molecular weight 59,700 (trademark - Firestone 9282) | 6.0% |
| Alpha-methyl styrene resin (trademark - Amoco 18-290) | 1.0% |
| Hydrocarbon resin (trademark - Picco 189) | 1.0% |
| Butyl-benzyl phthalate (trademark - Monsanto S-160) | 4.8% |
| Mixture of antioxidants and complexing agents (trademark - Tenneco U-1776) | 0.9% |
| Hydrous magnesium silicate (trademark - Carey 7R) | 5.0% |
| Calcium carbonate, 40 mesh limestone | 75.3% |
| Pigments, various colors | 1.0% |

All of these examples of backing materials 30 may be either printed or unprinted. If printed, any conventional printing ink which is known to those skilled in the surface covering arts and which would be compatible with both the backing material 30 and the plastic-type material, e.g., plastisol 18, being used can be used.

In the nip 26 between heated embossing roll 20 and rubber backing roll 28, the printed surface 32 of the heated printed glass paper backing 30 comes into contact with the heated and gelled plastisol layer 18 on release paper 10. In the nip 26, pressure is exerted on the combination of the release paper 10 and the gelled plastisol 18 and the heated glass paper backing 30 while heat continues to be applied to the composite of the release paper 10 and the gelled plastisol 18 by both embossing roll 20 and glass paper backing 30. The heat and pressure in the nip 26 causes the gelled plastisol layer 18 to bond to the printed surface 32 of glass paper backing 30 and also causes the fusion of plastisol layer 18 in a pattern that duplicates the desired embossing pattern 22 on embossing roll 20. The ridges of the pattern 22 of embossing roll 20 form the valleys or low points in the release paper 10 and plastisol layer 18 and the valleys of the pattern 22 of embossing roll 20 cause the ridges or high points to be molded in the release paper 10 and plastisol layer 18. Since the plastisol is in a gelled state as it enters the nip between the embossing roll and backing roll, it is very moldable and formable. This allows the plastisol to be formed to duplicate the pattern 22 of embossing roll 20 without distorting the glass paper backing 30, it being understood that since release paper 10 is between the plastisol layer 18 and the pattern 22 on the circumference of embossing roll 20, the release paper must be thin enough and extensible enough to also follow the contours of the pattern 22 of embossing roll 20. Although it has been stated that the plastisol layer 18 is fused in a pattern duplicating pattern 22 of embossing roll 20 as it passes through the nip 26, it is understood that fusion of a plastisol does not happen instantaneously but is a time-temperature function. Therefore, the fusion of the plastisol in the pattern duplicating pattern 22 of embossing roll 20 continues after the combination of release paper, plastisol layer, and glass paper backing leaves the nip 26.

After the combination exits from the nip 26 between embossing roll 20 and backing roll 28, it travels for a time sufficient to complete fusion of the plastisol layer 18 and to allow the material to cool. The release paper must stay on the surface of the plastisol layer 18 long enough for the fused plastisol material to cool below its critical distortion temperature, i.e., the temperature below which the fused plastisol will not distort when unrestrained, or, stated in relation to the example being described, the temperature below which the pattern formed in the fused plastisol by the pattern 22 on embossing roll 20 will not change when there is no release paper restraining the surface 34 of the fused plastisol. After the plastisol temperature is below this critical distortion temperature, the release paper 10 is stripped from the surface 34 of the embossed plastisol layer 18 by a conventional stripping roller 36. The stripped release paper is then wound onto a conventional wind-up roll 38. In this example, release paper 10 is stripped from the surface 34 of the embossed plastisol layer when the temperature of the plastisol is about 140° F. (60° C.).

The embossed decorative surface covering 40 made by the method of this invention has a plastisol layer 18 thickness (this is now the wear layer of the embossed decorative surface covering) of 0.002" (0.005 cm) in the valleys or low points of the pattern and 0.014" (0.036 cm) in the ridges or high points of the pattern, thus giving an embossing depth of 0.012" (0.030 cm). The backing of the embossed decorative surface covering 40 is the printed glass paper backing 30. This backing is essentially undistorted since all of the forming and/or molding of the embossed decorative surface covering occurs in the wear layer of the covering. In this example of this method, the line speed is from about 8 to 10 feet/min. (2.44 to 3.05 meters/min.).

Although the method of this invention has been described to produce an embossed decorative surface covering having a backing material and a plastic-type surface material, the method of the invention could equally well be used to form merely an embossed wear layer for later application to some backing material since the back of the embossed surface material is essentially smooth and would easily lend itself to a lamination process. This could be accomplished by having the backing material 30 be of some release type carrier which would form a strippable bond between the backing and the surface of the plastisol layer which comes into contact with this backing. Other variations in the use of this method will be obvious to those skilled in the art and are intended to come within the purview of the inventive technique described herein.

What is claimed is:

1. A method of forming an embossed decorative surface covering having a backing material and a plastic-type surface material comprising the steps of:
   (a) providing a strippable supporting material,
   (b) coating a layer of liquid plastic-type material onto the strippable supporting material to form a strippable supporting material/plastic-type material composite,
   (c) positioning the strippable supporting material of said composite against a heated embossing roll having a desired pattern,
   (d) heating said composite by maintaining said composite against said embossing roll through an arc equal to a substantial part of the circumference of said roll as said roll is rotated so that said liquid plastic-type material becomes gelled and so that said liquid plastic material is raised in temperature in preparation for embossing and fusion,
   (e) bringing a backing material into contact with the plastic-type material of said composite,
   (f) applying pressure to the combination of the composite and the backing material while the composite continues to be heated by said embossing roll to bond the plastic-type material to the backing material and to fuse the plastic-type material in a pattern that duplicates the desired pattern of the embossing roll, and
   (g) removing said strippable material from the fused plastic-type material of the embossed decorative surface covering.

2. The method of claim 1 wherein said composite is maintained against said embossing roll through an arc equal to approximately 180°.

3. The method of claim 1 wherein the plastic-type material comprises a thermoplastic material and the strippable supporting material comprises a release coated release paper.

4. The method of claim 3 wherein the thermoplastic material is coated onto the release coated release paper in a layer having a thickness in the range of about 0.006" (0.015 cm) to 0.025" (0.063 cm), and preferably in the range of about 0.013" (0.033 cm) to 0.020" (0.051 cm).

5. The method of claim 1 wherein the backing material is a prined glass paper.

6. The method of claim 1 wherein the heated embossing roll is heated to a temperature of at least 180° F.

7. The method of claim 1 comprising the additional step of heating the backing material prior to bringing said material into contact with the plastic-type material of said composite.

8. The method of claim 7 wherein the backing material is heated to a temperature in the range of from about 65° F. (18.3° C.) to 400° F. (204° C.).

9. The method of claim 1 wherein the step of applying pressure to the combination of the composite and the backing material comprises the step of passing the combination through the nip between said embossing roll and a backing roll.

10. The method of claim 9 wherein the step of bringing the backing material into contact with the plastic-type material of said composite is accomplished in the nip between said embossing roll and said backing roll.

11. The method of claim 9 wherein the backing roll is rubber having Durometer readings in the range of from about 55 to 90.

12. The method of claim 11 wherein said embossing roll and said backing roll are each driven independently.

13. The method of claim 1 wherein the plastic-type material comprises a thermosetting material and the strippable supporting material comprises a release coated release carrier.

14. The method of claim 1 wherein said strippable material is removed from the fused plastic-type material at a temperature below the critical distortion temperature of the fused plastic-type material.

15. A method of forming an embossed surface layer of a plastic-type material comprising the steps of:
   (a) providing a strippable supporting material,
   (b) coating a layer of liquid plastic-type material onto the strippable supporting material to form a strippable supporting material/plastic-type material composite,
   (c) positioning the strippable supporting material of said composite against a heated embossing roll having a desired pattern,
   (d) heating said composite by maintaining said composite against said embossing roll through an arc equal to a substantial part of the circumference of said roll as said roll is rotated so that said liquid plastic-type material becomes gelled and so that said liquid plastic-type material is raised in temperature in preparation for embossing and fusion,
   (e) bringing a release type backing material into contact with the plastic-type material of said composite,
   (f) applying pressure to the combination of the composite and the release type backing material while the composite continues to be heated by said embossing roll to releasably bond the plastic-type material to said backing material and to fuse the plastic-type material to said backing material and to fuse the plastic-type material in a pattern that duplicates the desired pattern of the embossing roll,
   (g) removing said strippable material from the fused plastic-type material of the embossed surface layer, and
   (h) removing said backing material from the fused plastic-type material of the embossed surface layer.

16. The method of claim 15 wherein said composite is maintained against said embossing roll through an arc equal to approximately 180°.

* * * * *